(12) United States Patent
Gerbut

(10) Patent No.: US 10,870,217 B2
(45) Date of Patent: Dec. 22, 2020

(54) BASALT SANDWICH-PANEL ADDITIVE MANUFACTURING

(71) Applicant: Maksym Gerbut, Kiev (UA)

(72) Inventor: Maksym Gerbut, Kiev (UA)

( * ) Notice: Subject to any disclaimer, the term of this patent is extended or adjusted under 35 U.S.C. 154(b) by 282 days.

(21) Appl. No.: 15/966,326

(22) Filed: Apr. 30, 2018

(65) Prior Publication Data

US 2018/0311863 A1    Nov. 1, 2018

Related U.S. Application Data

(60) Provisional application No. 62/492,304, filed on May 1, 2017.

(51) Int. Cl.
| | | |
|---|---|---|
| *B28B 1/00* | (2006.01) |
| *B33Y 80/00* | (2015.01) |
| *B33Y 10/00* | (2015.01) |
| *B33Y 30/00* | (2015.01) |
| *B29C 64/106* | (2017.01) |
| *B28B 11/04* | (2006.01) |
| *B28B 3/26* | (2006.01) |
| *E04B 1/35* | (2006.01) |
| *B29C 48/07* | (2019.01) |
| *B29C 48/14* | (2019.01) |
| *B33Y 70/00* | (2020.01) |
| *B29K 105/04* | (2006.01) |
| *E04G 21/04* | (2006.01) |

(52) U.S. Cl.
CPC ............ *B28B 1/001* (2013.01); *B28B 3/2636* (2013.01); *B28B 11/042* (2013.01); *B29C 48/07* (2019.02); *B29C 48/14* (2019.02); *B29C 64/106* (2017.08); *B33Y 10/00* (2014.12); *B33Y 30/00* (2014.12); *B33Y 70/00* (2014.12); *B33Y 80/00* (2014.12); *E04B 1/3505* (2013.01); *B29K 2105/04* (2013.01); *B29K 2995/0002* (2013.01); *E04G 2021/049* (2013.01)

(58) Field of Classification Search
CPC ..................................................... E04B 1/3505
See application file for complete search history.

(56) References Cited

U.S. PATENT DOCUMENTS

| | | | | |
|---|---|---|---|---|
| 6,035,583 A * | 3/2000 | Papke | ....................... | E04B 1/12 52/268 |
| 7,874,825 B2 * | 1/2011 | Khoshnevis | ............ | B29C 48/14 425/114 |

* cited by examiner

*Primary Examiner* — Adam Krupicka
(74) *Attorney, Agent, or Firm* — Nadya Reingand; Yan Hankin

(57) ABSTRACT

The present invention includes an insulating panel for building structures, a printing device for making an insulating panel for building structures, and a method for the manufacturing of an insulating panel for building structures. The insulating panel resulting from the printing device comprises a multi-layered basalt sandwich wall that is made of external layers on either side of a middle layer. The external layers comprise a load-bearing coating made from basalt, and the middle layer comprises a heat insulating material made from basalt (basalt wool or foamed basalt). As a result, a specific sandwich-panel is manufactured from one local raw material (basalt), which possesses high mechanical and heat insulating properties. Such technology can be used for erecting comfortable buildings for colonists for long term use even under severe climatic conditions of solar system planets and satellites where appropriate raw materials exist.

7 Claims, 7 Drawing Sheets

BASALT SANDWICH-PANEL ADDITIVE MANUFACTURING

CROSS-REFERENCE TO RELATED APPLICATIONS

This patent application relates to and claims priority to U.S. Provisional Patent Application Ser. No. 62/492,304, filed May 1, 2017, which is incorporated fully herein by reference.

FIELD OF THE INVENTION

The present invention relates generally to additive manufacturing used for construction of buildings, and in particular to a process of erection of specific sandwich panels from local raw material (basalt), which possess high mechanical and heat insulating properties.

BACKGROUND OF THE INVENTION

Different additive manufacturing technologies for building construction have been widely known since the 2000s (see, e.g., U.S. Pat. Nos. 6,035,583, 7,874,825). Most known technologies employ rapid layering of a concrete-like construction material to manufacture walls and roofs. The main disadvantage of such technologies is the need to prepare special construction materials (e.g., powders or chemical foam-like product) for additive manufacturing directly on the construction site or for delivery of finished mixtures to the construction site. This problem is especially relevant when considering the possibility of construction in remote areas of the earth without the necessary infrastructure or on other planets and satellites of the solar system. Also, most known technologies do not comprise the simultaneous erection of load-bearing walls and their thermal insulation. The present invention addresses these and other concerns.

SUMMARY OF THE INVENTION

The main objective of present invention is to eliminate the aforementioned problems and limitations, develop additive manufacturing technology that can be used far from any supply base and which can use surrounding raw materials as construction materials.

In particular, the disclosed technology is an insulating panel for building structures, a printing device for making an insulating panel for building structures, and a method for the manufacturing of an insulating panel for building structures. In general, the insulating panel resulting from the printing device comprises a multi layers (e.g., triple-layered) basalt sandwich wall that is made of external layers on either side of a middle layer. The external layers comprise a load-bearing coating made from basalt, and the middle layer comprises a heat insulating material made from basalt (basalt wool or foamed basalt). Each vertical layer of the panel may be printed layer-by-layer (i.e., the panel may be as tall as necessary or desired for the particular building structure). Each horizontal layer of the panel may be printed simultaneously (i.e., the middle and exterior layers may be printed simultaneously). It is noted that each horizontal layer of the panel may comprise more than 3 layers, wherein additional insulating and/or load-bearing layers are formed exterior to a triple-layered panel as described herein. For example, a five-layered panel may be produced by adding additional layers of foamed basalt or basalt wool exterior to the solid basalt layers. The device and method may similarly be adjusted to include nozzles for forming such additional layers. As a result, a specific sandwich-panel is manufactured from one local raw material (basalt), which possesses high mechanical and heat insulating properties. Such technology can be used for erecting comfortable buildings for colonists for long term use even under severe climatic conditions of solar system planets and satellites with appropriate raw materials on their surface.

BRIEF DESCRIPTION OF THE DRAWINGS

FIG. 3A shows a rear view. FIG. 3B shows a side view.

DETAILED DESCRIPTION OF THE PREFERRED EMBODIMENT

The present invention can be used in construction activity without limitation and including construction of buildings on other planets of the solar system with appropriate raw materials on their surface.

General Structure of the Insulating Panel for Building Structures.

Figure 1:
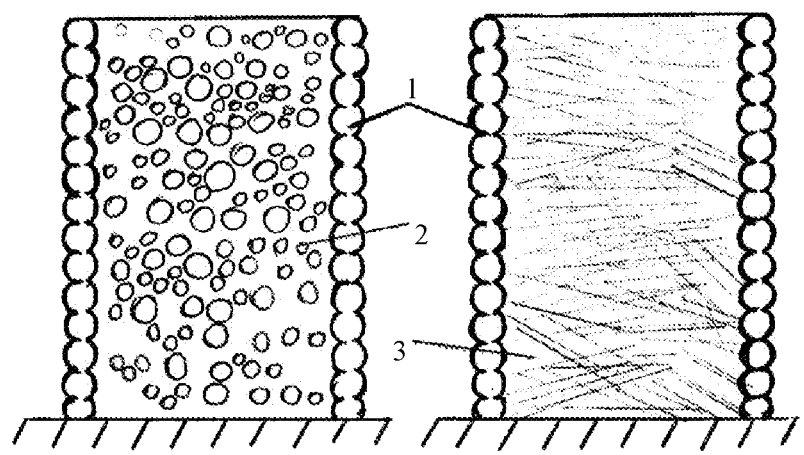
FIG. 1 is a general principal structure of a multi-layered basalt sandwich wall according to the present invention. This embodiment shows a triple-layered wall.

A multi-layer wall according to the present invention is schematically shown in FIG. 1. The wall's external layers 1 comprise a load-bearing coating made from basalt (second material), which is printed layer-by-layer. The wall's middle layer is a heat insulating material (first material) comprising basalt wool 2 or foamed basalt 3. This particular embodiment shows a triple-layered wall or panel.

The sandwich structure of a wall is proposed for several reasons. First of all, the sandwich structure is beneficial for high heat insulation of a building by means of an interlayer with the rarefied (e.g. Martian) atmosphere in the pores of foamed basalt or basalt wool. Secondly, the sandwich structure is beneficial because the physical and mechanical properties of a composite wall are better than the characteristics of a solid basalt wall having the same thickness. Such a solution significantly saves the energy for melting basalt, because much less material is required for erecting the central insulating layer as compared with the construction of a solid wall of the same thickness.

In some aspects, the insulating panel for building structures of the present invention comprises a middle layer, said middle layer comprising a first material, said first material resulting from a combination of a molten basalt and a reagent, said combination occurring to form said first material at an atmospheric temperature (i.e. without heating or cooling, allowing the reagent and molten basalt to combine), said middle layer being formed as an insulating layer. The panel further comprises an external layer located on each side of the middle layer, each external layer comprising a second material, said second material comprising solid basalt, each external layer being formed as a load-bearing layer for bearing the weight of the building structure. The middle layer and each external layer combine to form a multi-layered (e.g., triple-layered) panel which is manufactured by a single printing device. The middle layer and each external layer of the panel are formed simultaneously by the printing device. The reagent can be $CO_2$ dry ice, $Fe_2O_3$, or $TiH_2$.

It is further noted that each horizontal layer of the panel may comprise more than 3 layers, wherein additional insulating and/or load-bearing layers are formed exterior to a triple-layered panel as described herein. For example, a five-layered panel may be produced by adding additional layers of foamed basalt or basalt wool exterior to the solid basalt layers. A seven-layered panel may also be produced by adding additional solid basalt layers exterior to the five-layered panel (and so on). The device and method may similarly be adjusted to include additional nozzles for forming such additional layers. The number of layers required or desired is determined based on particular building parameters including but not limited to number of floors of a building, heat efficiency, purpose of building, etc.

Testing of the General Insulating Panel Structure for Energy Efficiency.

Figure 2:
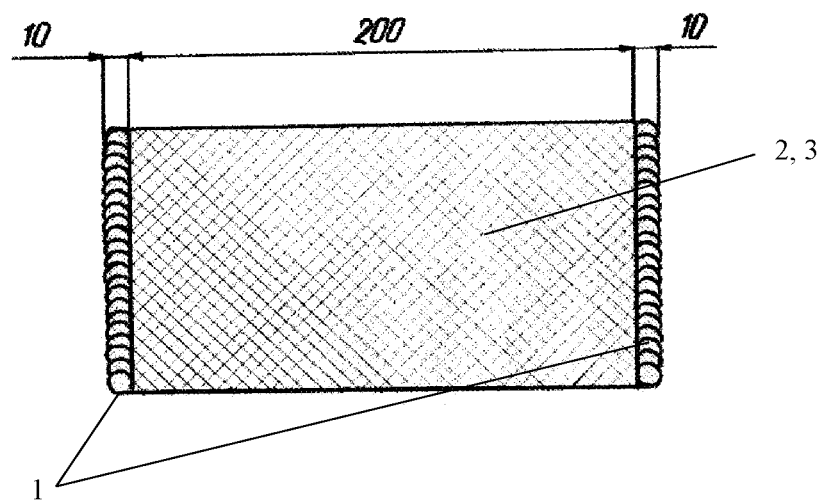
FIG. 2 is an exemplary sandwich panel structure for calculation of energy efficiency according to the present invention.

During experimentation, an energy efficiency comparison was made between (a) a solid basalt wall 220 mm thick and (b) a basalt wall comprising a sandwich panel structure with a middle layer comprising foamed basalt and (c) a basalt wall comprising a sandwich panel structure with a middle layer comprising basalt wool (at a temperature gradient from −120° C. to +20° C.). The thickness of each external sandwich panel wall was 10 mm, and the thickness of the heat insulator middle layer was 200 mm (see FIG. 2). The results are detailed below, referencing each type of wall structure:

(a) Heat transmission of the solid basalt wall was associated with a U-value=1.16 W/(m²·K). Heat losses of 1 m² of the wall were Q=2,333 W/hr.

(b) Heat transmission of the sandwich-panel (with foamed basalt middle layer) was associated with a U-value=0.3 W/(m²·K). Heat losses of 1 m² of the wall were Q=42 W/hr.

(c) Heat transmission of the sandwich-panel (with basalt wool middle layer) was associated with a U-value=0.17 W/(m²·K). Heat losses of 1 m² of the wall were Q=24.5 W/hr.

Based on the above results, the thickness of a solid basalt wall should be between 12 m and 20 m, in order to achieve the same characteristics of the energy efficiency of the sandwich panel structured walls, with middle layers comprising foamed basalt or basalt wool, according to the present invention.

Printing Process, Printing Device, and Method for Manufacturing Insulating Panels for Building Structures.

Crushed basaltic igneous (CBI) rock, said CBI rock having an $SiO_2$ weight percent less than or equal to 57 percent, is used as a basic material for printing (e.g., the Martian surface abounds in 0.001-0.01 mm fractions of the preliminary sieved basalt Martian rock). Crushed dry $CO_2$ ice, which is available in a solid state in the polar ice caps of Mars and also under the soil layer, is used as a foaming reagent for obtaining the porous structure of basalt.

The dry $CO_2$ ice sublimes to a gaseous state due to heating, thus creating pores (cavities) in the melt. The gas volume significantly decreases, which causes the formation of rarefied gas with low thermal conductivity in the pores. Powder reagents $Fe_2O_3$ or $TiH_2$ can be used as alternatives (the required basalt to $TiH_2$ ratio is 1:0.02-0.04).

Figure 3A:
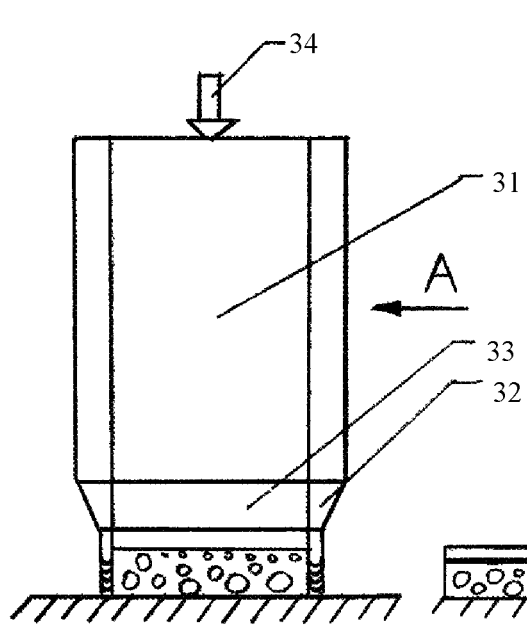
FIGS. 3A-3B show a principal scheme of a sandwich panel additive manufacturing technology according to the present invention.
Figure 3B:
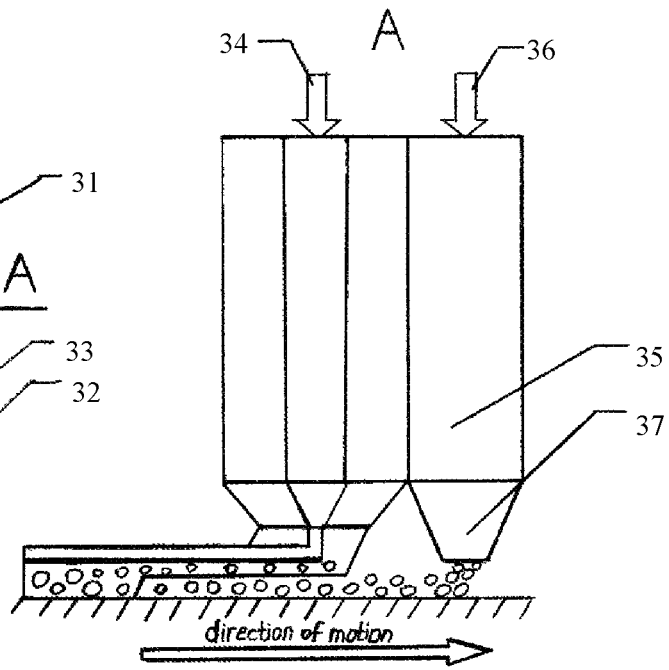

The basalt melt is supplied to three nozzles, a central nozzle and two out nozzles positioned on either side of the central nozzle. These three nozzles are located on a line, the line being perpendicular to the printer head movement. A fourth nozzle is located in front of the middle nozzle of the three nozzles located on a perpendicular line. Outer nozzles of the perpendicular line of nozzles extrude the basalt coating. The middle nozzle of the line of perpendicular nozzles applies molten basalt on top of a reagent, said reagent being extruded by the fourth nozzle located in front of the middle nozzle, for foaming. The foaming occurs as the reagent combines with the molten basalt material in between the load-bearing outer layers formed by the two outer nozzles. FIG. 3 shows a printer diagram according to the above description, having the following elements: 31—induction furnace; 32—nozzles for forming the basalt coating; 33—nozzle for extruding basalt on reagent (e.g., dry $CO_2$ ice); 34—basalt supply to the reactor; 35—reactor for crushing reagent; 36—reagent supply to the reactor; 37 nozzle for reagent supply to the construction area (underneath molten basalt).

In another embodiment, the basalt melt is supplied to three nozzles, and the reagent is supplied to a fourth nozzle. The reagent nozzle is positioned between two basalt melt nozzles, and these three nozzle (basalt-reagent-basalt) are located on a line, the line being perpendicular to the printer head movement. The third basalt melt nozzle is located behind the middle nozzle of the three nozzles located on a perpendicular line (i.e., behind the reagent nozzle). Outer nozzles of the perpendicular line of nozzles extrude the basalt coating. The middle nozzle of the line of perpendicular nozzles applies reagent prior to and underneath a basalt melt, said basalt melt being extruded by the third basalt melt nozzle located behind the middle nozzle. The combination of basalt on top of reagent causes foaming of the basalt.

Figure 4:
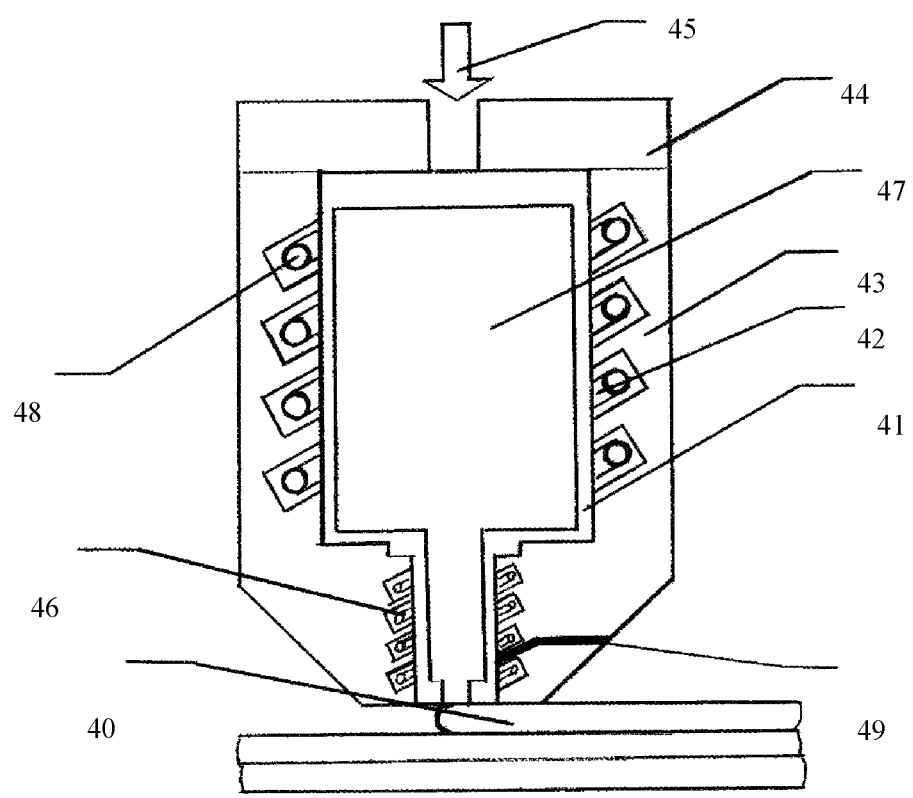
FIG. 4 is a principal cross-section of a reactor for melting basalt or other raw material according to the present invention.

The mechanism for printing side load-bearing walls includes the use of a furnace reactor. Tiny fractions of the crushed basaltic igneous rock are constantly supplied to a basalt melt within the furnace reactor via the basalt supply 34. The furnace reactor heats the melt 30-50° C. higher as compared with the melting temperature required for homogenization. FIG. 4 shows the principal cross-section of the reactor furnace. Basalt stock material 45 is loaded in the graphite crucible 41. The induction heating of the graphite crucible 41 is carried out after the heating coils 42 with water-cooling elements 48 are switched on, which causes the flashing of the basalt raw material layer, adjacent to the crucible, and formation of basalt in a liquid form 47. Since basalt is current conductive (i.e. a conductive material), the melting process smoothly flows from the crucible walls to the center of bulk raw material mass and throughout the crucible 41. The liquid form of raw material continues to flow into the nozzle of the furnace reactor. The nozzle is surrounded by induction heating elements 46 which adjust the melt viscosity and the rate of its supply to the printing area. A thermocouple 49 precisely adjusts the temperature of raw material at the output/outlet of the nozzle. The induction furnace also has a shell 43 and cover 44 for safety purpose. The outlet of the nozzle comprises a printed basalt roller 40. The printing head is preferably made from heat-resistant and wear-resistant ceramics (for example, SiC).

Figure 5:
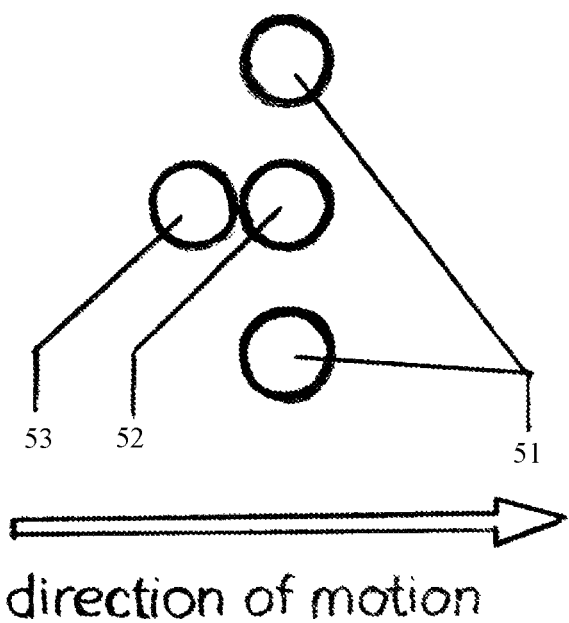
FIG. 5 shows exemplary locations of printheads according to the present invention.

FIG. 5 shows the positioning of nozzles of one embodiment of the present invention (the second embodiment discussed above). Reference numerals for FIG. 5 are as follows: 51—position of nozzles for printing the load-bearing walls of formwork, 52—position of the spraying jet for extruding reagent, 53—position of nozzle for applying the layer of molten basalt on the layer of reagent.

Figure 6:
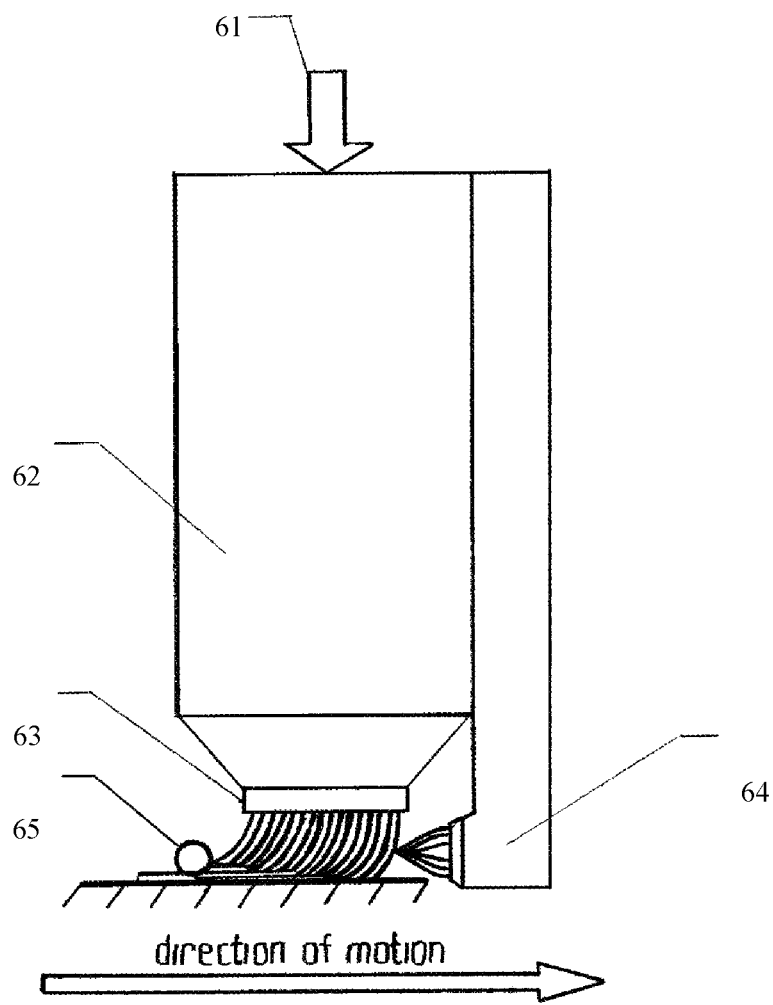
FIG. 6 is an exemplary schematic diagram of printing basalt sandwich panels with a middle layer of basalt wool.

The process for forming a basalt wool additive is similar to the process for making basalt foam described above. However, instead of the combination of reagent and basalt, basalt wool is supplied in the cavity between external walls. The mechanism for making basalt wool comprises a reactor furnace, a set of heat resistant dies, and a tamping roller (see FIG. 6). Basalt raw material is loaded 61 into the induction furnace 62. The molten basalt enters the die 63, thus forming fiber workpieces. Micro-fibers are then formed by means of a compressed $CO_2$ gas jet flow (from sublimed dry ice) 64. The tamping roller 65 is located behind the nozzle (relative to the direction of motion of the printer head), wherein the tamping roller 65 compacts the formed basalt wool to a density of 60-100 kg/m$^3$. The formed wool adheres to the hot load-bearing surfaces of basalt during the printing process.

In some aspects, the invention comprises a device for printing an insulating panel for building structures comprising a first chamber and a second chamber. The first chamber comprises an induction furnace for receiving and melting crushed basalt, said first chamber being connected to three nozzles comprising a central nozzle and two outer nozzles, each of said three nozzles extruding a molten basalt material, said two outer nozzles being located on opposite sides of the central nozzle. The second chamber comprises a reagent crusher for receiving and crushing a reagent, said second chamber being connected to a reagent nozzle, said reagent nozzle extruding the reagent, said reagent nozzle being located in front of said central nozzle. The printing device forms a multi-layered panel by moving in a direction while the following actions are performed by the nozzles: (1) said two outer nozzles extrude the molten basalt material in an absence of reagent to form two exterior load-bearing layers comprising basalt, (2) said reagent nozzle extrudes the reagent in between said two exterior load-bearing layers, and (3) said central nozzle extrudes molten basalt material onto the reagent and in between said two exterior load-bearing layers. Thus, in between the exterior layers, said reagent and said molten basalt material extruded via said central nozzle combine to form an interior insulating layer. Although a triple layered panel is made by the device described above, additional nozzles may be increased per device depending on the number of layers desired within the panel. If a five-layered panel is instead desired, two additional nozzles for extruding insulating material (basalt wool, foamed basalt) are positioned exterior to the two outer nozzles described above. If a seven-layered panel is desired, two additional nozzles are positioned exterior to the insulating material extruding nozzles of the five-layered panel device design. These two additional nozzles extrude molten basalt in an absence of reagent to form additional load-bearing layers. Additional layers above seven may be formed in a similar manner by including additional nozzles for extruding either insulating material or load-bearing material.

The printing device (or printer head of the device) then pivots and moves in a second direction to form another vertical layer of the same panel on top of the first panel layer. In this manner, the panel is built vertically to any height desired. In other aspects, the printer or printing head may move in a circular pattern and thus does not need to pivot but simply raises itself vertically to repeat the circular pattern. The reagent can be $CO_2$ dry ice, $Fe_2O_3$, or $TiH_2$. The interior/middle layer can be foamed basalt or basalt wool.

In some aspects, the invention comprises a method for manufacturing an insulating panel for building structures, the method comprising providing a printing device, said printing device comprising a first chamber and a second chamber. The first chamber comprises an induction furnace for receiving and melting crushed basalt, said first chamber being connected to three nozzles comprising a central nozzle and two outer nozzles, each of said three nozzles extruding a molten basalt material, said two outer nozzles being located on opposite sides of the central nozzle. The second chamber comprises a reagent crusher for receiving and crushing a reagent, said second chamber being connected to a reagent nozzle, said reagent nozzle extruding the reagent, said reagent nozzle being located in front of said central nozzle. The printing device forms a multi-layered panel by moving in a forward direction while the nozzles perform the following actions: (1) said two outer nozzles extrude the molten basalt material in an absence of reagent to form two exterior load-bearing layers comprising basalt, (2) said reagent nozzle extrudes the reagent in between said two exterior load-bearing layers, and (3) said central nozzle extrudes molten basalt material onto the reagent and in between said two exterior load-bearing layers. Thus, in between the exterior layers, said reagent and said molten basalt material extruded via said central nozzle combine to form an interior insulating layer. The printing device (or printer head of the device) then pivots and moves in a second direction to form another vertical layer of the same panel on top of the first panel layer. In this manner, the panel is built vertically to any height desired. In other aspects, the printer or printing head may move in a circular pattern and thus does not need to pivot but simply raises itself vertically to repeat the circular pattern. The reagent can be $CO_2$ dry ice, $Fe_2O_3$, or $TiH_2$. The interior/middle layer can be foamed basalt or basalt wool.

Algorithm of Strengthening the Printed Structure by Means of Dry Masonry of Uncut Stones.

Figure 7:
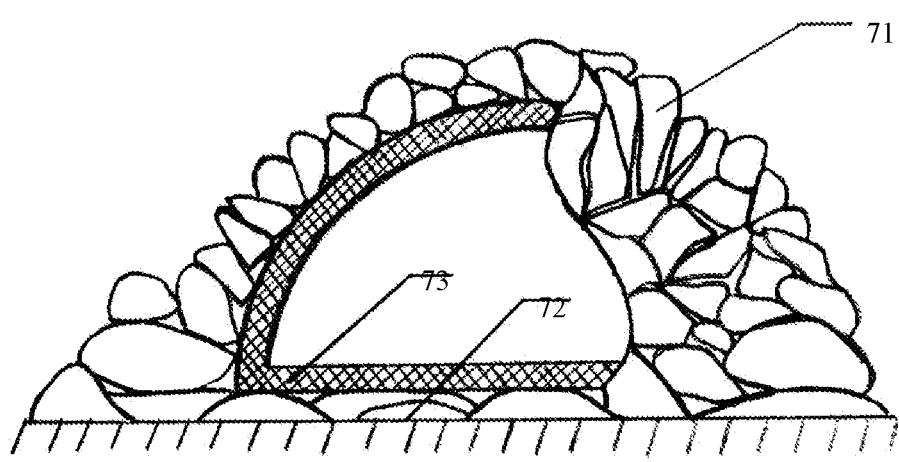
FIG. 7 illustrates an exemplary structure of a stone shield for a printed building.

Considering the severe climatic conditions of solar system planets and satellites (e.g., Mars) such as temperature variations, storms, and space radiation, it may be further beneficial to improve the durability of a structure by creating an additional layer from stone rocks. In such situations, it is preferable to erect a thick shield from local rocks for protection against space radiation, e.g., on the Mars surface (see FIG. 7). Creation of a stone shield 71, 72 for a printed building 73 solves the problem of high radiation. At the same time, it has a low energy intensity because it is based on applying local materials without additional processing. The construction technology using dry masonry of uncut stones is described below:

Stage 1. Creation of virtual space terrain model and scanning the stones on adjacent territories (their geometry and chemical composition at a depth down to 10 m).

Stage 2. Search of Stone Construction Units (hereinafter referred to as SCUs). The scanning data with position coordinates affixation are transmitted to the computer, where they are processed, and the database of SCUs is formed.

Stage 3. Forming the database of stone construction units. After the SCU database is formed, experts calculate the route for their transportation, taking out, and repeated detailed scanning using modulated light.

Stage 4. Forming the virtual structure model. SCU models are integrated into the virtual model of shielding structure on the basis of a mathematical space model of the printed building, after that the process of territory scanning terminates.

Stage 5. Installation. A manipulator robot, which is located directly at the construction site, scans each SCU, positions itself, and installs the structure in accordance with the virtual structure model.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. An insulating panel for building structures, comprising:
   a middle layer, said middle layer comprising a first material, said first material resulting from a combination of a molten basalt and a reagent, said combination occurring to form said first material at an atmospheric temperature, said middle layer being an insulating layer,
   an external layer located on each side of the middle layer, each external layer comprising a second material, said second material comprising solid basalt, each external layer being a load-bearing layer.

2. The insulating panel of claim 1, wherein said middle layer and each external layer are formed simultaneously via a single printing device.

3. The insulating panel of claim 1, wherein the first material comprises foamed basalt.

4. The insulating panel of claim 1, wherein the first material comprises basalt wool.

5. The insulating panel of claim 1, wherein the reagent is $CO_2$ dry ice.

6. The insulating panel of claim 1, wherein the reagent is $Fe_2O_3$.

7. The insulating panel of claim 1, wherein the reagent is $TiH_2$.

* * * * *